United States Patent [19]
Schmidt

[11] 3,970,480
[45] July 20, 1976

[54] AIR-VENTED LEAKPROOF BATTERY CELL

[75] Inventor: Jacob E. Schmidt, Little Falls, N.J.

[73] Assignee: McGraw-Edison Company, Elgin, Ill.

[22] Filed: Feb. 19, 1975

[21] Appl. No.: 550,981

Related U.S. Application Data

[63] Continuation-in-part of Ser. No. 376,328, July 5, 1973, abandoned.

[52] U.S. Cl. ............................................. 136/177
[51] Int. Cl.² ...................................... H01M 10/36
[58] Field of Search ............ 136/162, 163, 166, 177

[56] References Cited
UNITED STATES PATENTS

| | | | |
|---|---|---|---|
| 1,115,018 | 10/1914 | Poole | 136/177 |
| 2,472,852 | 6/1949 | Lighton | 136/177 |
| 2,530,539 | 11/1950 | Raney et al. | 136/177 |
| 2,565,010 | 8/1951 | Warner | 136/162 |

Primary Examiner—John H. Mack
Assistant Examiner—H. A. Feeley

[57] ABSTRACT

An air-vented battery cell containing liquid electrolyte is rendered leakproof against spillage during shipping and during usages when the cell is tilted from a vertical position in any direction to a horizontal position, as when used on a marine buoy, by providing the cell with a vent reservoir across the top thereof having a liquid connection with the cell at only one corner thereof and having a vent tube in the reservoir at the top part thereof, leading through one end wall diagonally to nearly an opposite corner portion thereof. In three tilt positions of this cell at 90° intervals from a vertical to a horizontal position, a limited flow of electrolyte into the reservoir is well below the inner open end of the vent tube, and in the fourth such tilt position the electrolyte in the reservoir enters the vent tube through only a small length, typically 10–20% thereof, with the result that the cell is protected against any leakage from shaking thereof while tilted and is provided further with a reserve against leakage through the vent tube if an increase in gas pressure occurs within the cell while it is so tilted.

8 Claims, 10 Drawing Figures

AIR-VENTED LEAKPROOF BATTERY CELL

This application is a continuation-in-part of my pending application Ser. No. 376,328, filed July 5, 1973, now abandoned, entitled "Air-Vented Leakproof Battery Cell".

The invention has special utility in connection with air-depolarized primary batteries and is herein particularly described in connection with such a battery, but no unnecessary limitation thereto is intended since the invention has application not only to liquid-electrolyte primary cells but also to liquid-electrolyte secondary cells which do not gas extensively during charge and discharge.

Liquid-electrolyte batteries are typically prefilled with electrolyte before shipping and provided with vent caps over the filler openings for gas venting and pressure relief so that the containers will not break open and/or leak corrosive electrolyte. Also, it is common to provide the vent caps with tilt-sensitive valves which will close the vent openings against leakage of electrolyte when the cells are tilted as during handling, shipping and usages where tilting is a common occurrence, such as in applications on buoys. Unfortunately, when such tilt valves are closed against leakage, they also close off all venting. Thus, if for any reason there is a generation of internal pressure while the valve is closed, seals (pitch or cement) may be broken to cause leakage of electrolyte. Still further, tilt-sensitive vent valves have been ineffective to prevent leakage during shipping even when the cells are maintained upright. This is because, when the electrolyte is splashed up against the vent openings, globules of the electrolyte will pass through the openings and be retained by capillary action, and when more splashing occurs further globules will go through the vent openings and displace the ones already there to cause an intermittent leakage. This phenomenon is of such a serious extent that over a long haul as on a truck or a railroad car much electrolyte can be spilled out with damage to surrounding areas and with hazard to personnel called on to handle the batteries and, of course, with the further requirement that the lost electrolyte must be replaced before the cell can be put into use.

In an effort within the prior art to cope with the foregoing problems disclosed by a Poole U.S. Pat. No. 1,115,018, the cell is provided with a vent tube connected thereto at one corner of the cell and extended diagonally across the cell to an opposite corner thereof. In two 90° interval tilt positions of this cell the electrolyte does not reach the level of the outlet opening to the vent tube with the result that the cell is vented and is safe against leakage even from any increase in internal pressure. However, in the other two 90° interval tilt positions the electrolyte flows into the vent tube to the level of that in the cell — which is nearly to the open end of the tube to provide no reserve against leakage through the vent tube should there be an internal gassing while the cell is so tilted.

An improved safeguard against leakage under the above conditions is obtained by the present invention in a very simple and economical manner by providing the cell container with a fluid opening only to a corner portion of a vent reservoir overlying the cell, and by providing the reservoir with a vent opening only through a tube which leads through one end wall of the reservoir and extends diagonally of the reservoir to an opposite corner portion thereof. Further, the fluid opening between the cell and reservoir is typically made through two adjacent tubes, one of which extends from the cover of the cell into the reservoir to nearly the top thereof to serve primarily as an air vent between the reservoir and the cell, while the other is terminated flush with the bottom wall of the reservoir and serves primarily as a liquid vent between the reservoir and cell whereby to enable the liquid to flow readily back into the cell when it is righted from any tilted position.

Objects of the invention are to provide a novel and economical container structure for liquid-electrolyte battery cells, free of moving parts, which will provide gas venting and pressure relief while still preventing leakage as a result of shaking or bouncing of the cells during shipment or as a result of tilting the cells from the vertical into horizontal positions during usages such as when the cells are mounted on buoys for activating signals.

Another object is to provide a liquid-electrolyte cell which a chamber between a vent opening in the cover of the container and a vent opening to the outside to prevent leakage from splashing of electrolyte against the cover.

Another object is to vent a cell containing liquid electrolyte through a reservoir at the top of the cell having a fluid connection with the cell at only one corner portion of the reservoir and having a vent opening to the atmosphere only through a diagonal vent tube within the reservoir leading diagonally from one corner portion of the reservoir through an opposite end wall thereof whereby to provide a pressure reserve against leakage through the vent tube from gassing of the cells while the cell is tilted in a horizontal position.

These and other objects and features of the invention will be apparent from the following description and the appended claims.

In the description of my invention, reference is had to the accompanying drawings, of which:

FIG. 1 is a perspective view partly broken away of an air-depolarized primary cell having a vent reservoir at the top of the container according to the invention;

FIGS. 2 and 3 are sectional views respectively on the lines 2—2 and 3—3 of FIG. 1;

Figure 1:
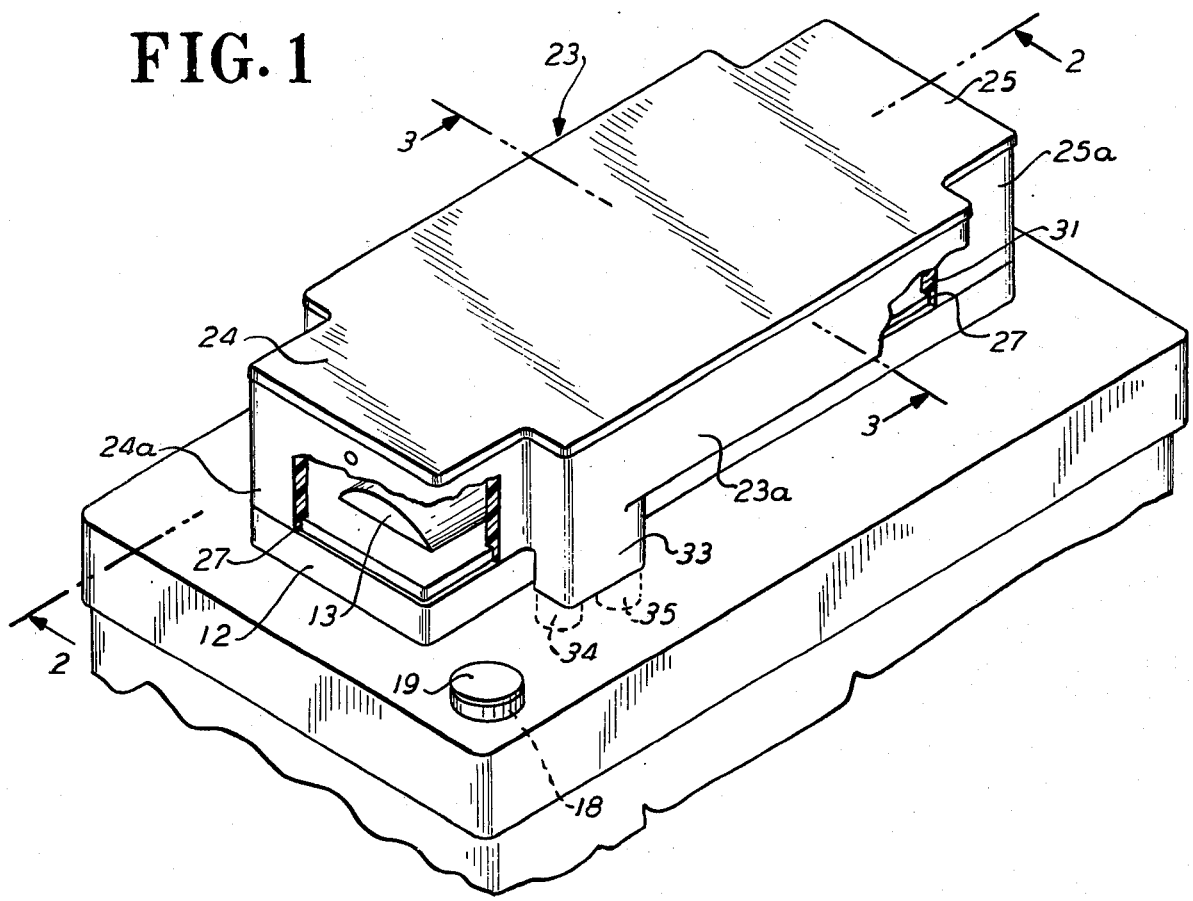

The present battery cell has a container 10 of rectangular shape made preferably of suitable plastic which is provided with a cover 11 cemented leaktight over the top edge thereof. This cover has a raised rectangular section 12 centrally located and provided with a rectangular opening 12a receiving the top portion of a block-shaped air-depolarizing carbon cathode 13. The cathode is supported by the top cover and is sealed around the periphery thereof to the edge of the opening 12a as by a suitable sealing compound 14. This cathode extends typically about one-third down through the height of the cell container. Supported by suitable means not shown at the opposite sides of the cathode along the lower half portion thereof are zinc anodes 15. The remaining lower portion of the container is filled with a granular lime 16 in accordance with the teaching of the Dunham U.S. Pat. No. 2,450,472. The cells are typically prefilled before shipping with an electrolyte 17 as of a potassium hydroxide solution via a filler opening 18 in the cover 12 as to a height typically about one-half inch from the cover. After filling, the filler opening is sealed by a cap 19.

Figure 2:
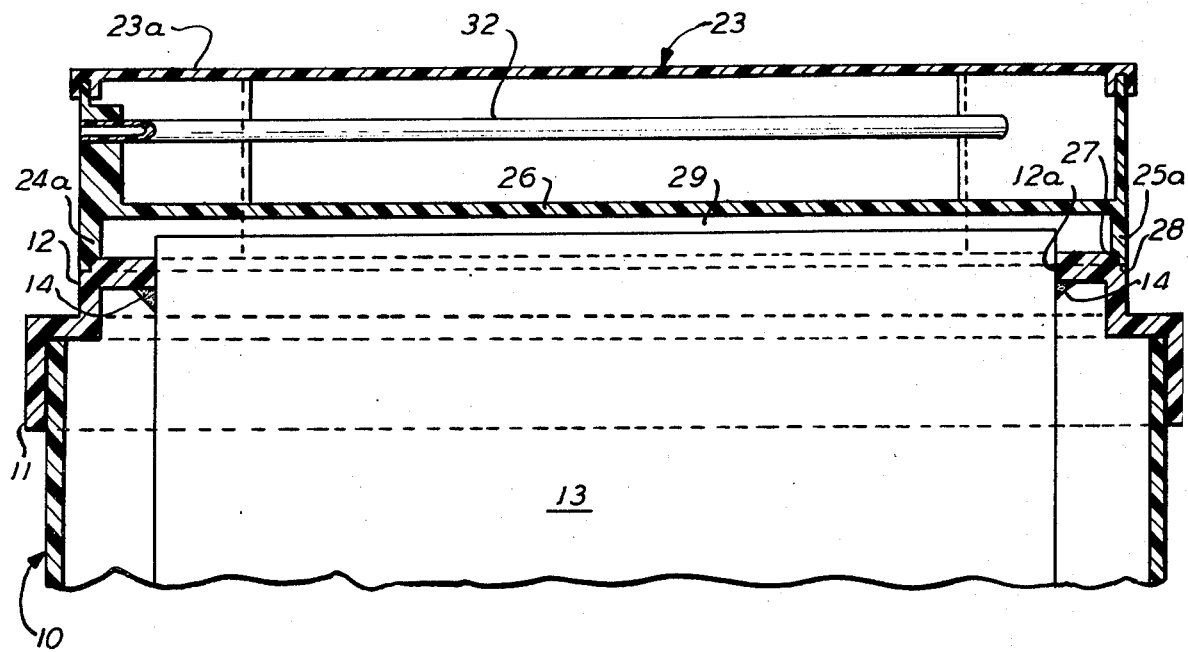
Figure 4:
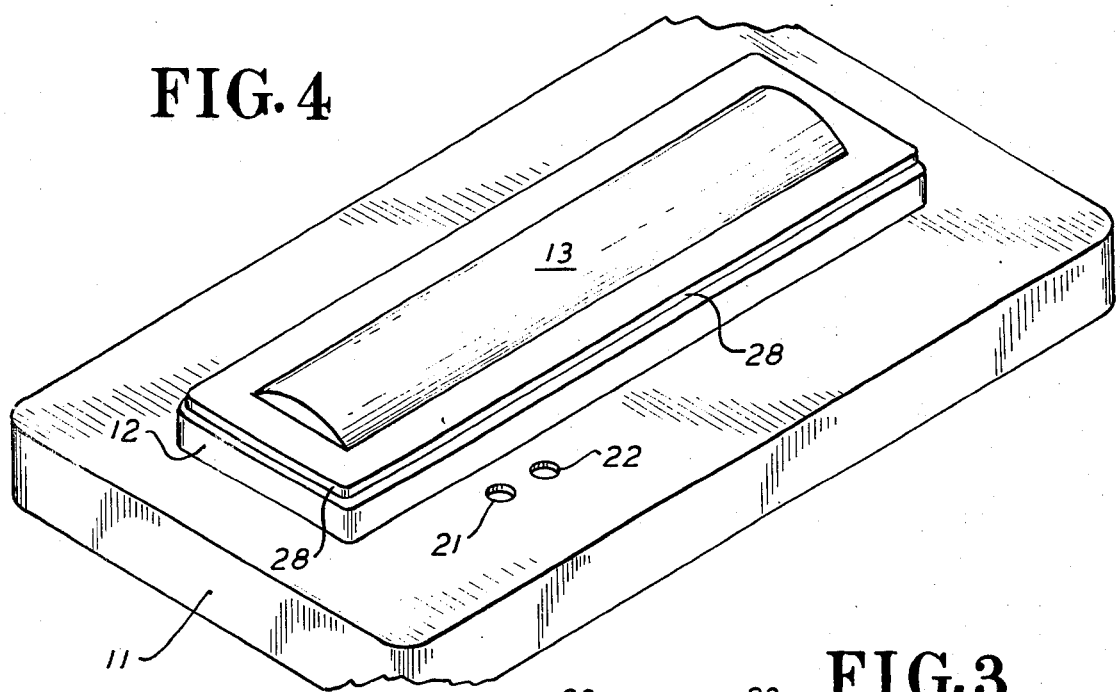
FIG. 4 is a view of a top portion of the cell container with the vent reservoir removed.
Figure 6:
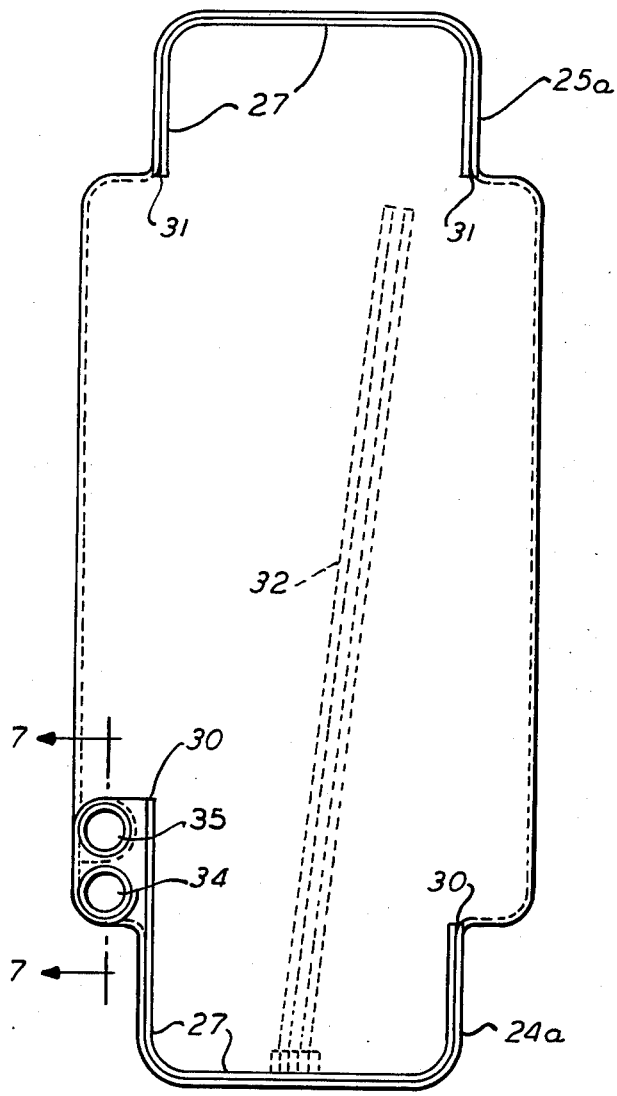
FIG. 6 is a bottom view of the vent reservoir as it would appear before the reservoir is mounted on the cell container.

The cover 12 has two openings 21 and 22 through which, as will appear, communication is had with a vent reservoir 23 mounted on the top of the cover 11 in overlying spaced relation to the cathode 13. The reservoir has opposite end portions 24 and 25 of a reduced width. The side walls of these end portions depend below the bottom wall 26 of the reservoir, forming legs 24a and 25a (FIG. 1) which have rabbeted bottom edges 27 that seat on similarly rabbeted sections 28 of the respective end portions of the raised cover section 12 to support the reservoir above the cathode (FIG. 2). The intermediate portion of the reservoir is wider than the raised section 12 of the cover but has no side walls depending below the bottom wall 26 of the reservoir to provide side openings 29 (FIG. 3) between the bottom wall 26 and raised section 12 that extends from the inside edge 30 of the leg 24a to the inside edge 31 of the leg 25a (FIG. 6).

Figure 3:
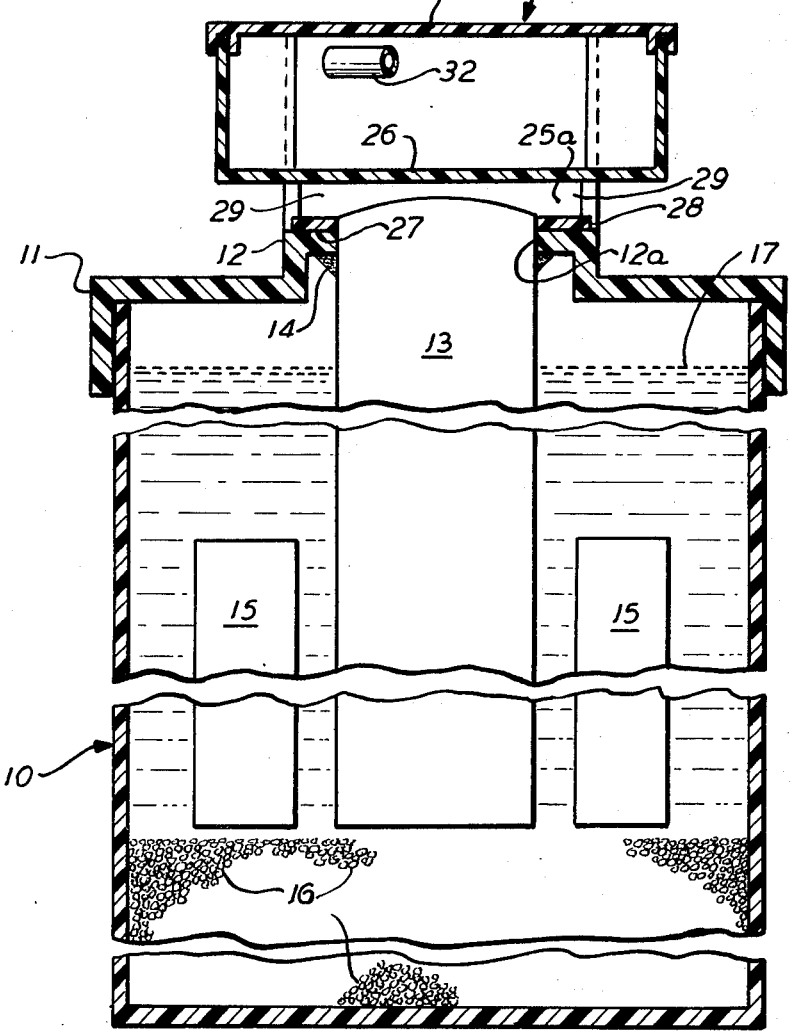

By way of illustrative example and by reference to the vertical cross sectional views shown by FIGS. 2 and 3, which depict the cell accurately as commercially used, the cell has a height of 9 inches, a width of 3½ inches, and a length of 8¼ inches, and the reservoir has a height of 1 inch, a width of 2¼ inches, and a length of 7¾ inches. Thus the ratio of internal volume of the reservoir to that of the cell is approximately only 7½%. Further, considering that the cell is occupied to approximately one-half its internal volume by the anode and cathode elements and by the lime mass, the ratio of electrolyte volume which the reservoir can receive relative to the electrolyte volume in the cell is of the order of 14½%.

Figure 7:
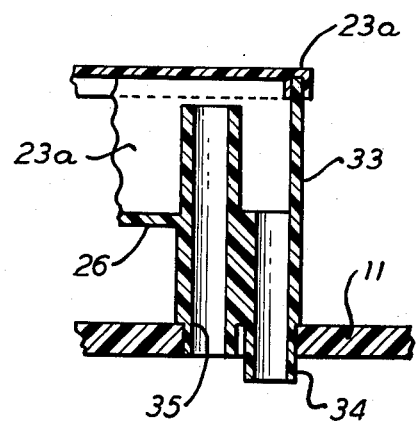
FIG. 7 is a fractional sectional view showing the interconnecting tubes between the reservoir and container so they appear from the lines 7—7 of FIG. 6.

A vent duct for the reservoir 23 in the form of a tube 32 is positioned adjacent the cover 23a and extends centrally through the side wall of the end portion 24 diagonally to the other end portion 25 of the reservoir. A boss 33 depends from a corner of the wider central portion of the reservoir diagonally opposite the inner end of the vent tube 32 (FIGS. 1 and 5), and seats on the top face of the cover 11 when the reservoir is mounted in place. Through this boss are two adjacent interconnecting tubes 34 and 35 which fit into the openings 21 and 22 of the cover and which are sealed to the cover against leakage. These tubes form internal vent openings between the container and reservoir at about one-fourth of the length from the end thereof. The tube 34 at the very corner of the wider central portion of the reservoir is flush with the bottom wall 26 of the reservoir (FIG. 7) and extends into the container about 3/16 inch beyond the inner wall of the cover 11. The tube 35 on the other hand is flush with the inside wall of the cover 11 and extends nearly to the top wall 23a throughout about 85% of the height of the reservoir. The tube 35 is therefore adapted to serve primarily as an air vent and the tube 34 as a liquid vent between the container and reservoir to permit a fast return of electrolyte from the reservoir to the container through the tube 34 when the cell is righted from a tilted position.

Figure 5A:
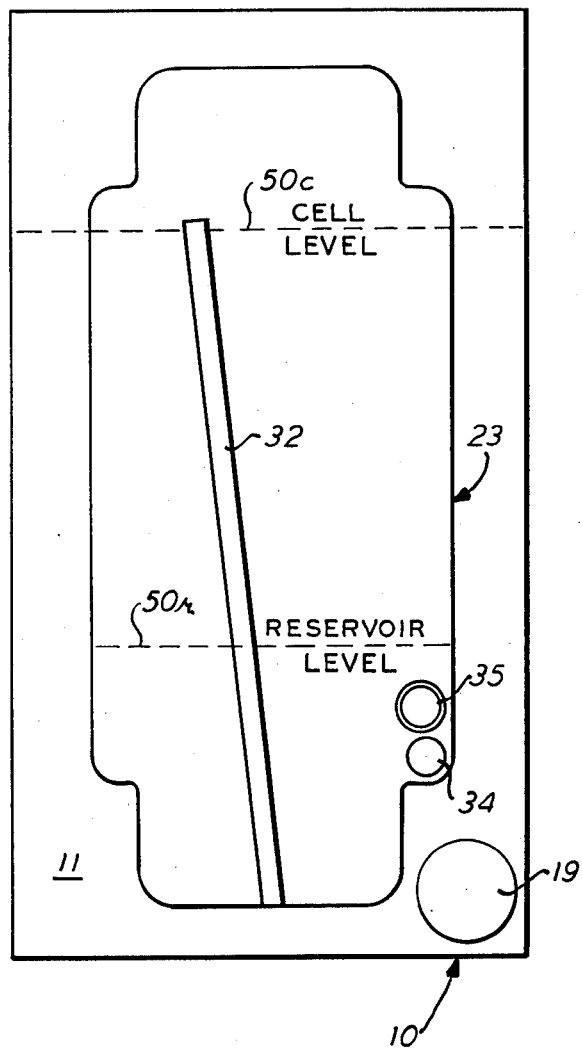
FIGS. 5A, 5B, 5C and 5D are respective end views of the present cell when tilted at respective 90° intervals from an upright to a horizontal position, each showing the typical levels of the electrolyte in the cell and reservoir for the respective position.

In the position of the cell shown in FIG. 5A, the cell and reservoir levels stabilize at the lines 50c and 50r with the air pressure in the reservoir being at the atmosphere level and the air pressure in the cell being below atmospheric by the pressure head developed between the two levels. Since the level in the reservoir is far below the inner end of the vent tube, there is no leakage whatever from violent shaking of the battery back and forth in all directions from this horizontal position. Further, there is a good reserve against leakage through the vent tube from any pressure increase within the cell because this increase would have to be sufficient to raise the level in the reservoir through approximately half the height thereof to the inner end of the vent tube before any electrolyte would enter the tube.

Figure 5B:
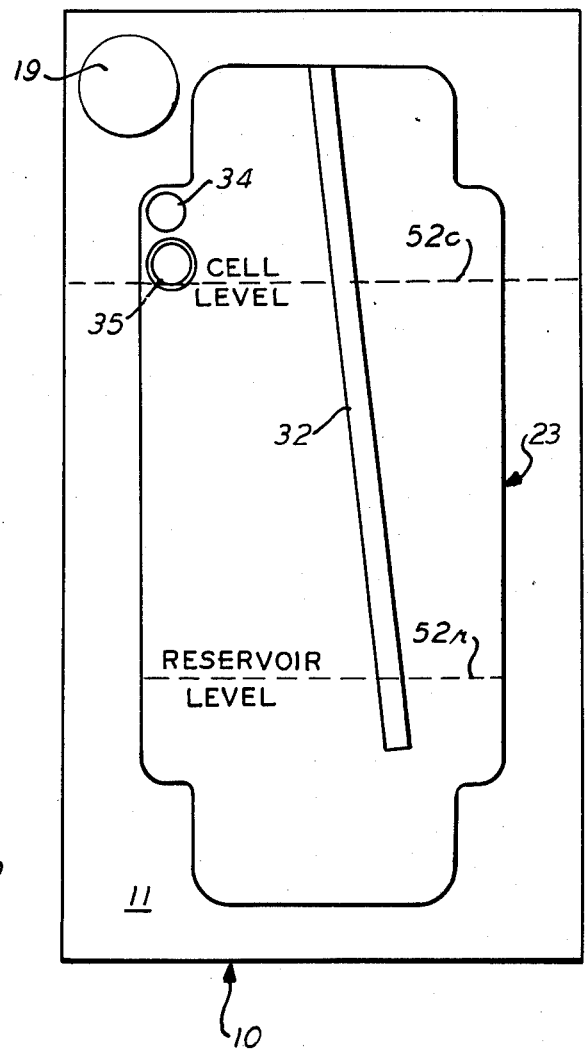
Figure 5C:
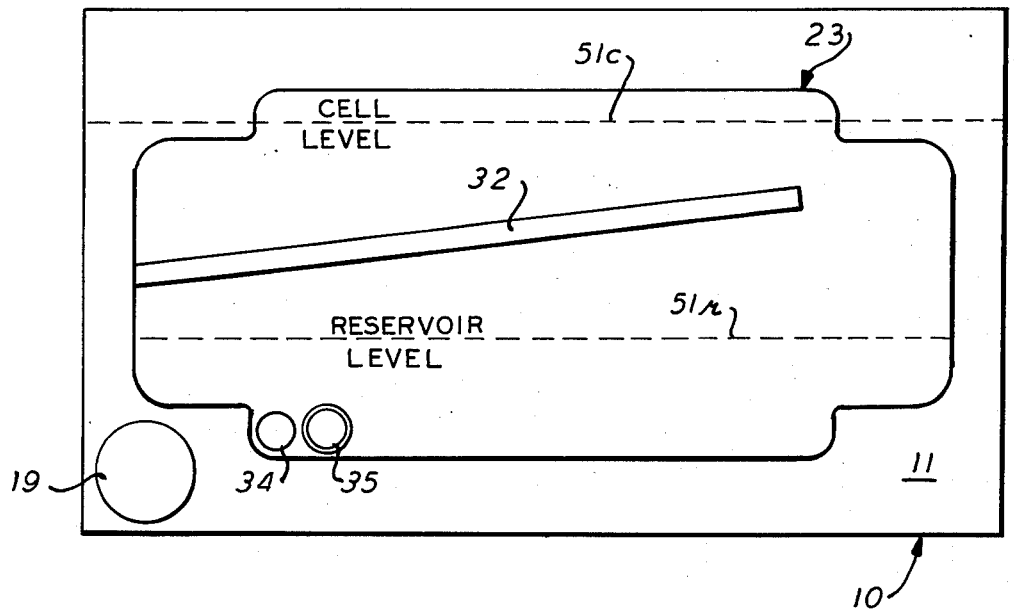

In the tilt position of the cell shown in FIG. 5C, the cell and reservoir levels stabilize at 51c and 51r. The situation here is the same as in FIG. 5A, with the result that violent shaking of the battery in this horizontal position produces no leakage. Further, there is a good reserve against leakage from an internal pressure increase within the cell since there would be required a sufficient pressure increase to raise the level in the reservoir through approximately half of its width dimension, which would mean a transfer again of liquid equal to about half the volume of the reservoir, before the electrolyte would rise to a level sufficient to enter the inner end of the vent tube.

In the tilt position of the cell shown in FIG. 5B, the cell and reservoir levels stabilize at the lines 52c and 52r, with the air pressure in the cell and reservoir being the same and initially at atmospheric level. Since the electrolyte level in the vent tube is at the far end from its opening to the atmosphere and to a height of only approximately 10% of the length of the vent tube thereof, the cell is immune from any leakage due to violent shaking of the cell in this position. Further, the internal pressure in the cell and reservoir would have to increase to produce a pressure head sufficiently to raise the level of the electrolyte in the vent tube through a height approximately to three-quarters the length of the reservoir before any leakage would occur through the vent tube.

Figure 5D:
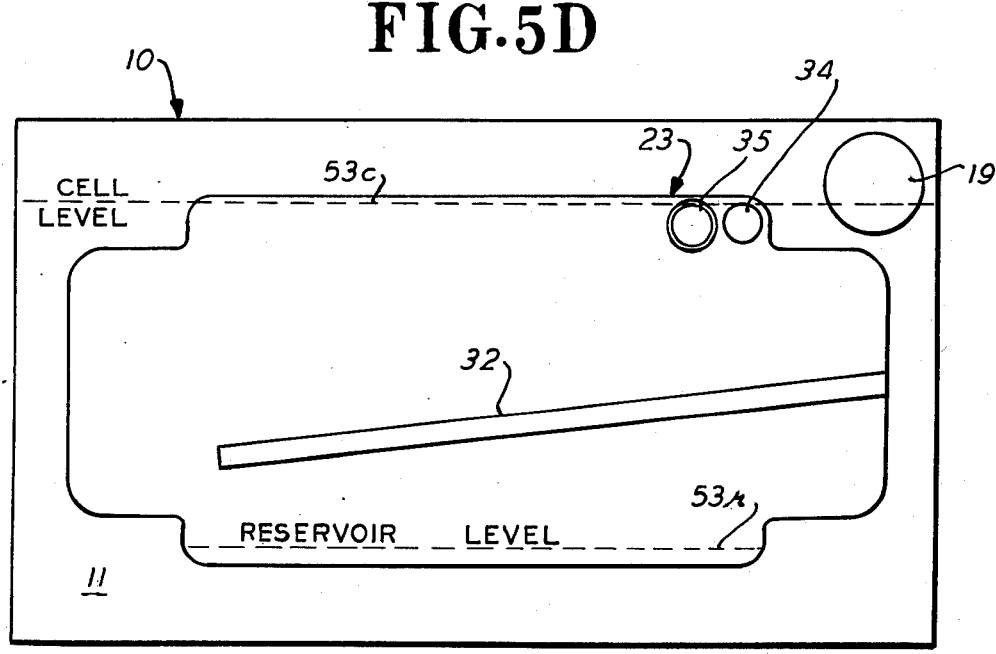

In the tilt position of the cell shown in FIG. 5D, the cell and reservoir levels stabilize at the lines 53c and 53r. Since the reservoir level is well below the inner end of the vent tube, any violent shaking of the battery in this tilt position produces no leakage. Further, since the level in the reservoir is not responsive to cell pressure, the cell has an unlimited reserve against leakage due to an increase in internal pressure.

It will be observed from the foregoing FIGS. 5A–5D that a common feature of the present venting system is that in each tilt position of the cell from the vertical to the horizontal the electrolyte falls far short of reaching the inner end of the vent tube or at most through only about 10% of the length of the vent tube as is the case in the position of FIG. 5B. But even in this position an even larger pressure head is required to be developed in the cell before leakage would occur. Thus in all instances there is a large reserve against leakage occurring from any internal pressure increase while the cell is tilted. In carrying out the invention it is desirable that the reservoir have about the full length of the cell and a width of more than half that of the cell. Further, the height dimension of the reservoir is preferably made small, typically about 10% or less than that of the cell. The vent tube may lead through either end of the reservoir but in each case it is preferably extended diagonally of the reservoir away from the fluid opening between the reservoir and the cell. Although a single fluid opening between the cell and reservoir will suffice, an opening provided by two adjacent tubes with one extended to serve primarily as an air vent, as described, is preferred so that there will be a ready return of the electrolyte to the cell when the cell is righted.

The embodiment of my invention herein particularly shown and described is intended to be illustrative and not necessarily limitative of my invention since the same is subject to changes and modifications without departure from the scope of my invention, which I endeavor to express according to the following claims.

I claim:

1. A vented battery cell having a liquid electrolyte and cathode and anode elements, said cell being capable of being tilted in any direction from a vertical to a horizontal position without leakage of electrolyte, comprising a container for said elements and electrolyte, a cover sealed to said container, a vent reservoir mounted on said cover and having a capacity less than that required to hold all the electrolyte in said cell, said reservoir having an opening between it and said cover at a corner of the reservoir, and a vent tube in said reservoir extending through one end wall thereof adjacent said corner and from said wall approximately to a diagonal corner of the reservoir opposite said one corner, said container and reservoir being hermetically sealed except for said vent tube.

2. The battery cell set forth in claim 1 wherein said vent reservoir extends across said cell approximately through the full length thereof, and through a major fraction of the width thereof.

3. The battery cell set forth in claim 2 wherein said reservoir has a height not exceeding approximately one-tenth the height of said container and enabling the reservoir to accommodate only a small portion of the electrolyte in the container.

4. The battery cell set forth in claim 1 wherein said container and reservoir are oblong as viewed from the top and said vent tube extends from said one end wall lengthwise of said reservoir and diagonally away from said opening to said diagonal corner.

5. The battery cell set forth in claim 1 wherein said opening between said reservoir and container is constituted by two adjacent connector tubes one of which ends flush with the bottom wall of said reservoir to serve primarily as a liquid vent for the reservoir to said container when the cell is returned to a vertical position and the other of which is extended approximately to the top wall of said reservoir to serve primarily as a gas vent between the reservoir and container when the cell is righted to a vertical position.

6. An air-vented liquid-electrolyte primary cell capable of being tilted from a vertical position to a horizontal position without leakage of electrolyte, comprising a container having a cover sealed thereto, anode and cathode elements in said container of which the cathode element comprises an air-pervious carbon body extending through a centrally-disposed opening in said cover in sealed relation thereto to expose a face of the cathode to the atmosphere, said container being filled with said electrolyte nearly to the level of said cover, and a vent reservoir having legs at two opposite ends thereof mounted on said cover to support the reservoir lengthwise of said cell in spaced overlying relation to said cathode to permit air access at the sides of the reservoir to the face of said cathode, tubular means forming an opening between a corner portion of said reservoir and said container, and a vent tube in said reservoir extending through one end wall thereof and diagonally of the reservoir to approximately an opposite corner thereof.

7. The primary cell set forth in claim 6 wherein said tubular means comprises two adjacent connector tubes between said corner portion of the reservoir and said container of which one tube is terminated flush with the bottom wall of said reservoir and the other tube extends approximately to the top wall of the reservoir whereby said one tube serves primarily as a liquid vent and said other tube primarily as a gas vent between the reservoir and container.

8. The primary cell set forth in claim 6 wherein said cover has a raised central section with a central opening therein receiving the upper portion of said cathode in sealed relation thereto, said vent reservoir has opposite end portions conforming to corresponding end portions of said raised section of said cover and said reservoir has a side wall depending from the bottom wall thereof of which the side wall of the opposite end portions of the reservoir are seated on the rim of said raised section of said cover to support the bottom wall of the reservoir above the top face of said carbon cathode, the intermediate portion of said reservoir between said end portions having a greater width than the corresponding portion of said raised section of the cover causing the depending wall of said intermediate portion to be displaced laterally from said raised section and above said cover to provide air access along the sides of the intermediate portion of the reservoir to the top face of said cathode.

* * * * *